W. A. RIDDELL.
FILM WINDING MECHANISM FOR CAMERAS.
APPLICATION FILED MAR. 16, 1918.
1,422,131.
Patented July 11, 1922.
3 SHEETS—SHEET 1.
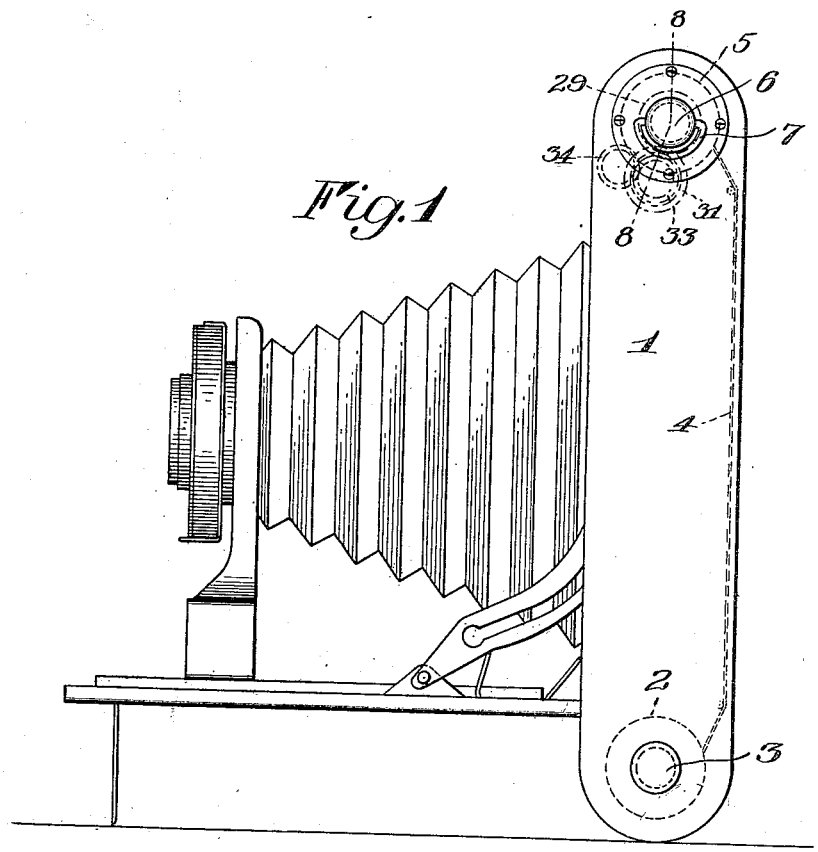
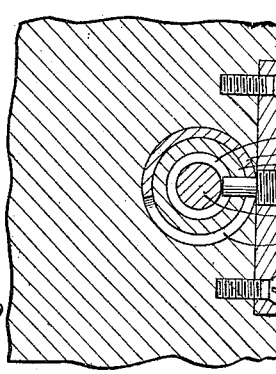
WITNESSES:
Nelson H. Copp
INVENTOR.
William A. Riddell
BY
his ATTORNEYS.

W. A. RIDDELL.
FILM WINDING MECHANISM FOR CAMERAS.
APPLICATION FILED MAR. 16, 1918.
1,422,131.
Patented July 11, 1922.
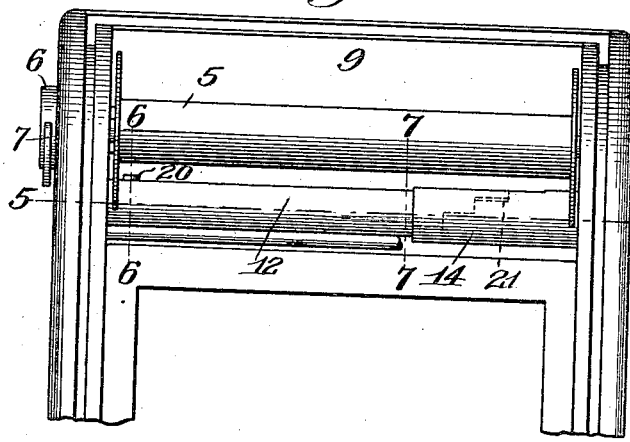
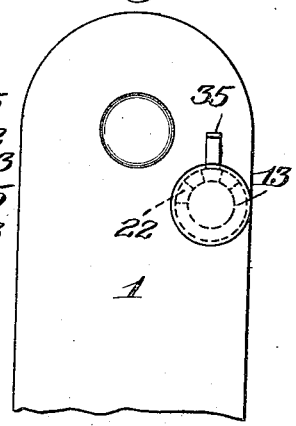
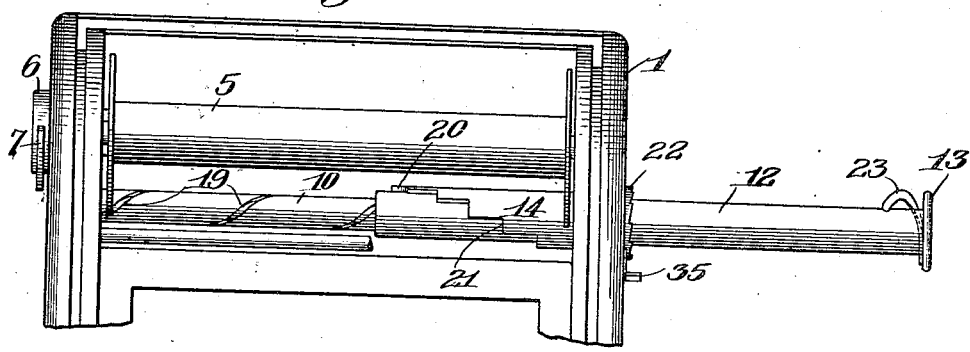
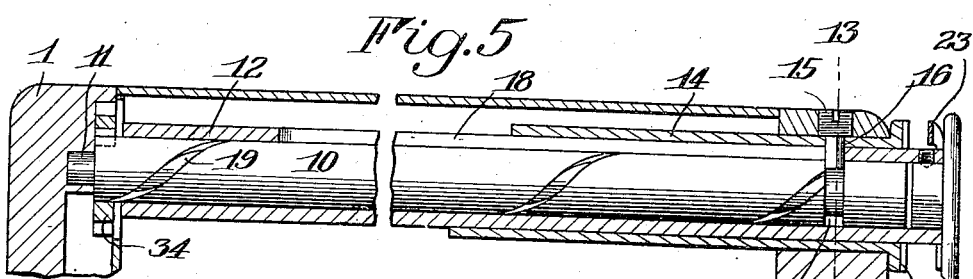
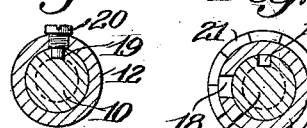
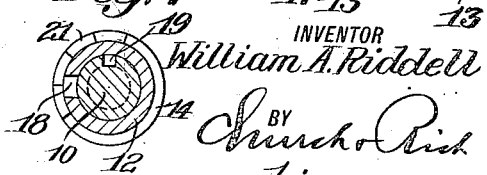

W. A. RIDDELL.
FILM WINDING MECHANISM FOR CAMERAS.
APPLICATION FILED MAR. 16, 1918.
1,422,131.
Patented July 11, 1922.
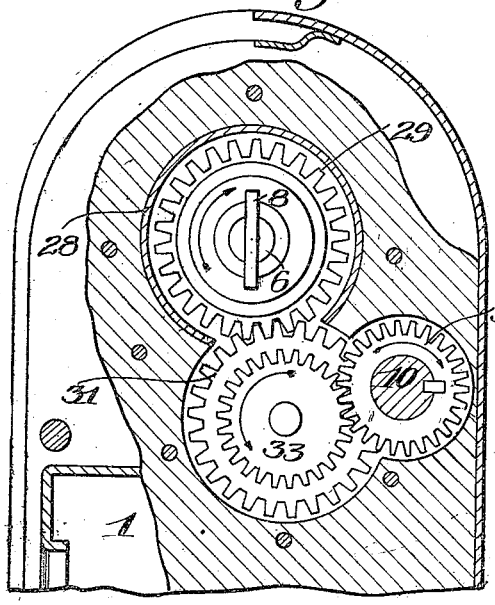
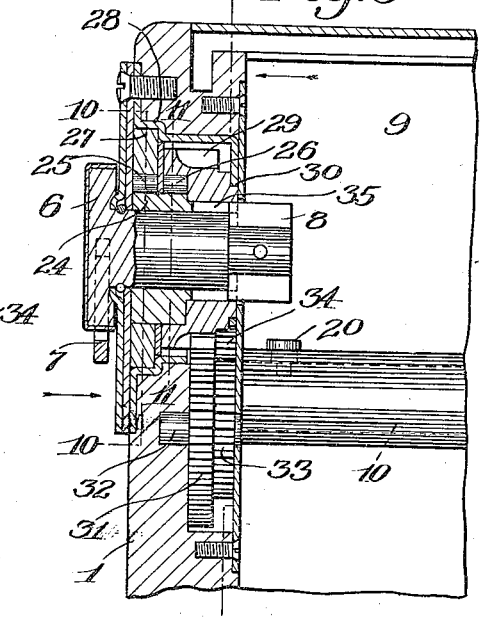
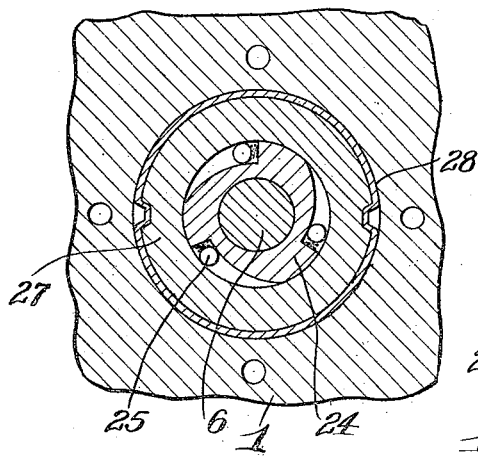
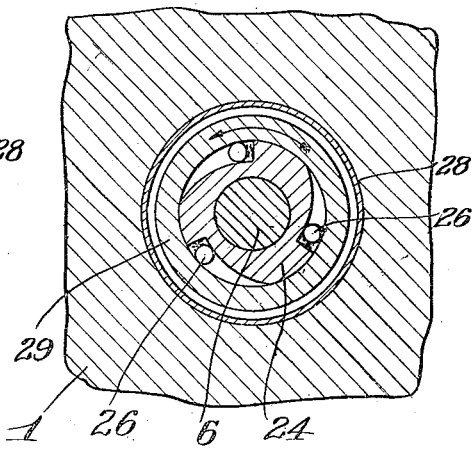
WITNESSES:
Nelson H. Copp
INVENTOR
William A. Riddell
BY
his ATTORNEYS

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

FILM-WINDING MECHANISM FOR CAMERAS.

1,422,131.  Specification of Letters Patent.  Patented July 11, 1922.

Application filed March 16, 1918. Serial No. 222,799.

*To all whom it may concern:*

Be it known that I, WILLIAM A. RIDDELL, of Rochester, in the county of Monroe and State of New York, have invented certain new and useful Improvements in Film-Winding Mechanisms for Cameras; and I do hereby declare the following to be a full, clear, and exact description of the same, reference being had to the accompanying drawings, forming a part of this specification, and to the reference numerals marked thereon.

My present invention relates to photography and more particularly to photographic film cameras and it has for its object to provide a simple and convenient film winding mechanism by means of which each exposed area of the film strip may be quickly wound off and the fresh picture area wound into its place through a simple operation performed by the user. The invention also contemplates an improved mode of compensating for the constantly increasing size of the take-up or winding roll whereby similar actuations of the operating member will turn the winding roll to an increasingly less extent so that a uniform length of film will be drawn off each time. To these and other ends the invention resides in certain improvements and combinations of parts all as will be hereinafter more fully described, the novel features being pointed out in the claims at the end of the specification.

In the drawings:

Figure 1 is a side elevation of a familiar type of film camera having a film feeding mechanism constructed in accordance with and illustrating one embodiment of my invention;

Figure 2 is a fragmentary rear view thereof with the back removed to reveal the winding mechanism, the same being in normal position;

Figure 3 is a similar view showing the winding mechanism set and about to operate;

Figure 4 is a fragmentary enlarged elevation of the side of the winding end of the camera opposite to that shown in Figure 1;

Figure 5 is an enlarged fragmentary section taken substantially on the line 5—5 of Figure 2;

Figure 6 is an enlarged section taken on the line 6—6 of Figure 2;

Figure 7 is an enlarged section taken on the line 7—7 of Figure 2;

Figure 8 is an enlarged fragmentary section taken substantially on the line 8—8 of Figure 1;

Figure 9 is a partial section on the line 9—9 of Figure 8 looking in the direction of the arrow;

Figure 10 is a section on the line 10—10 of Figure 8 looking in the direction of the arrow;

Figure 11 is a section on the line 11—11 of Figure 8 looking in the direction of the same arrow;

Figure 12 is a detail elevation of the operating member or push rod, and

Figure 13 is a section on the line 13—13 of Figure 5.

Similar reference numerals throughout the several views indicate the same parts.

The hand camera shown is of a familiar type and in Figure 1, 1 indicates the body, 2 a film spool at the lower end mounted on a center 3 and 4 the film strip that is drawn through the focal plain and onto a winding roll or spool 5, most of the foregoing parts being shown in dotted lines in said figure. The winding roll 5 may be turned by the usual key 6 having a handle portion 7 at its outer end and a head 8 at its inner end to engage the slot in the usual form of film spool.

In the practice of my invention I provide in the film chamber 9 adjacent to the winding roll 5 and parallel with its axis a rotatable cylinder 10 having a journal extension 11 at one end supported in a wall of the casing 1. Surrounding this cylinder and adapted to reciprocate thereon is a tubular push rod 12 terminating in a button or head 13 on the exterior of the casing 1, while surrounding the push rod is a rotatable sleeve 14 having a bearing in the opposite wall of the casing 1 and providing a bearing for that end of the push rod 12 and cylinder 10. These parts are held against longitudinal movement with the exception of the push rod, by a set screw 15 engaging within a segmental slot 16 in the sleeve 14 and an annular groove 17 in the cylinder 10. The push rod 12 is provided with a longitudinal slot 18 to receive the set screw 15 so that the push rod may be reciprocated on the cylinder 10 without being allowed to rotate. The surface of the cylinder 10 is cut by a spiral groove 19 and a screw or pin 20 extending through the push rod and carried thereby cooperates with this groove. It will therefore be seen that as the push rod is drawn out and then pushed in, it will rotate the cylinder 10 first in one direction and then the other. The cylinder is so geared to the winding roll 5 (in a manner that will be later described) that it rotates the latter in one direction only, namely, the winding direction and it accomplishes this when the push rod 12 is being thrust inwardly from the position of Figure 3 to that of Figure 2. Therefore, with each reciprocation of the push rod, a certain winding movement of the roll 5 is accomplished.

As the winding roll increases in size, it, of course, winds more film per revolution and provision is made for progressively reducing the movement thereof at each actuation of the push rod 12. It is to this end that the sleeve 14 is provided. At the inner end of the sleeve are a plurality of stepped stop shoulders 21 which, as the sleeve is rotated, present themselves successively in the path of the pin 20 on the push rod so that each time the push rod is withdrawn it is set for a shorter travel and hence a less rotative effect upon the driving cylinder 10 is developed. To automatically turn the stop sleeve and successively present the stop shoulders, it carries at its outer end a ratchet 22. As the push rod 12 is pressed inwardly, a spring finger 23 secured beneath the head 13 thereof engages a tooth of the ratchet and the subsequent depression or straightening of the finger causes it to turn the ratchet and through it, the sleeve the desired distance.

The transmission mechanism between the driving cylinder and the winding roll 5 is best shown in Figures 8, 9, 10 and 11. The winding key 6 (having the usual longitudinal retracting movement) is slidable in an annular clutch member 24 provided with a set of clutch rollers 25 and another set 26, both of a type well known in this art. The clutch rollers 25 cooperate with a fixed clutch ring 27 in a shell or casing 28 while the rollers 26 cooperate with a gear 29 having a bearing at 30 in the casing 28. When the key 6 is turned by hand in the winding direction, both sets of clutch rollers become inoperative as will be seen from an inspection of Figures 10 and 11 and it is intended that the film shall be initially so wound to adjust the first picture area of the film in the focal plane. Back wind is prevented, however, by the set of rollers 25 locking against the fixed ring 27.

The gear 29 meshes with a gear 31 having a bearing at 32 in the camera casing 1 and this gear carries a relatively fixed gear 33 meshing with a gear 34 fixed to the cylinder 10. The winding 6 through its head 8 is locked at all times to a slotted hub 35 on the clutch member 24. Therefore, as the push rod 12 is drawn out, as in Figure 3, rotating the cylinder 10 to the left or in a direction opposite to that of the arrow in Figure 9, the gear 29 on the key 6 will turn idly and in the same direction because of the clutch arrangement at 26, the key being held by the clutch rollers 25 to the fixed clutch ring 27. When the push rod is thrust in again, however, the cylinder 10 will be turned in the direction of the arrow in Figure 9 and the gear 29 in the same direction, which gear, through the clutch rollers 26, also turns the clutch member 24, the clutch rollers 25 then being inoperative. The clutch 24 being locked to the key by the slotted hub 35, the key turns in the direction of the arrow and winds the roll 5 throughout the movement of the push rod.

When it is desired to re-set or adjust the stop sleeve 14, it may be turned to the required extent by means of an arm 35 fixed thereto on the exterior of the camera body.

I claim as my invention:

1. In a film camera, the combination with a camera body and a film winding roll journalled in the side walls thereof, of driving means therefor embodying two telescopic members arranged parallel to the axis of the roll with one extending through one of said side walls, the longitudinal movement of which last mentioned member is adapted to impart rotary movement to the other and through it to the roll.

2. In a film camera, the combination with a camera body and a film winding roll journalled in the side walls thereof, of driving means therefor embodying two relatively longitudinally movable members arranged parallel to the axis of the roll with one extending through one of said side walls which last mentioned member is adapted to impart rotary movement to the other and through it to the roll.

3. In a film camera, the combination with a film winding roll, of driving means therefor embodying two relatively longitudinally movable members arranged parallel to the axis of the roll one of which is provided with a spiral groove and the other with a projection cooperating with said groove to impart rotary movement to the grooved member.

4. In a film camera, the combination with a film winding roll and driving means therefor embodying a push rod and mechanism for converting the reciprocatory motion thereof into rotary motion, of means for progressively limiting the actuating movement of the push rod comprising a sleeve surrounding the latter and provided with a plurality of stepped stops.

5. In a film camera, the combination with a film winding roll and driving means therefor embodying a push rod and mechanism for converting the reciprocatory motion thereof into rotary motion, of means for progressively limiting the actuating movement of the push rod comprising a rotary sleeve surrounding the latter and provided with a plurality of stepped stops and an abutment on the push rod adapted to cooperate, singly, with said stops.

6. In a film camera, the combination with a film winding roll and driving means therefor embodying a push rod and mechanism for converting the reciprocatory motion thereof into rotary motion, of means for progressively limiting the actuating movement of the push rod comprising a rotary sleeve surrounding the latter and provided with a plurality of stepped stops and an abutment on the push rod adapted to cooperate, singly, with said stops and means operated by the push rod at each actuation thereof rotating the sleeve and presenting a different stop for the abutment.

7. In a film camera, the combination with a film winding roll and driving means therefor embodying a push rod and mechanism for converting the reciprocatory motion thereof into rotary motion, of means for progressively limiting the actuating movement of the push rod comprising a rotary sleeve surrounding the latter and provided with a plurality of stepped stops and with a ratchet, an abutment on the push rod adapted to cooperate, singly, with said stops when the push rod is moved in one direction and a spring finger on the latter adapted to engage the ratchet and rotate the sleeve when the push rod is moved in the opposite direction.

8. In a film camera, the combination with a casing and a film winding roll therein, of driving means therefor embodying a rotary cylinder, a tubular push rod adapted to reciprocate thereon and impart rotary movement thereto, a sleeve surrounding the push rod and having a bearing in the casing, said sleeve being provided with a plurality of stepped stops and with a ratchet, an abutment on the push rod adapted to cooperate, singly, with said stops when the push rod is moved in one direction and a spring finger on the latter adapted to engage the ratchet and rotate the sleeve when the push rod is moved in the opposite direction.

9. In a film camera, the combination with a film winding roll, of a push-rod, a stop device rotatable about the rod for progressively limiting its reciprocatory movements and means operatively connected with the roll for converting the reciprocatory motion of the rod into rotary motion.

10. In a film camera, the combination with a film winding roll, of a push rod extending through the camera wall and adapted to reciprocate parallel with the axis of the roll and means operatively connected with the roll for converting the reciprocatory motion of the rod into rotary motion.

11. In a film camera, the combination of a film winding roll, a manually operable reciprocatory member guided in a defined path, means operatively connected with the roll and member for converting the reciprocatory motion of the member into rotary motion of the roll, a series of stops rotatable into said path of said member about an axis extending in the same direction as said path, and means for rotating said stops actuated from said member.

WILLIAM A. RIDDELL.

Witnesses:
HELEN M. FRASER,
MARGARET DUIGNAN.